United States Patent [19]

O'Brien et al.

[11] Patent Number: 5,556,074
[45] Date of Patent: Sep. 17, 1996

[54] HIGH TEMPERATURE VALVE

[75] Inventors: Fred R. O'Brien, Long Beach; Jerry E. Martin, Fullerton, both of Calif.

[73] Assignee: Pacific Valves, Long Beach, Calif.

[21] Appl. No.: 497,822

[22] Filed: Jul. 3, 1995

[51] Int. Cl.$^6$ .................................................. F16K 3/316
[52] U.S. Cl. ........................................ 251/329; 251/326
[58] Field of Search ..................................... 251/326, 329

[56] References Cited

U.S. PATENT DOCUMENTS 3,027,135 3/1962 Kellar .................................. 251/329 X
4,316,483 2/1982 Jandrasi .............................. 251/329 X

OTHER PUBLICATIONS

Pacific Valves Engineered Spec Gate/Globe/Check Valves; pp. BB–17; Published 1993.
Pacific Valves Sales Engineering Bulletin SEB–SP–3, Published Jul. 1964.

Primary Examiner—John C. Fox
Attorney, Agent, or Firm—Christie, Parker & Hale

[57] ABSTRACT

A valve utilizes secondary attachment methods for internal valve parts. A guide channel is attached to a valve body with a primary pin and weld arrangement and additionally with a dovetail arrangement between the guide channel and the body. A facing ring is connected to a stop utilizing a circumferential weld and additionally a bolt inserted through the facing ring and threaded into the stop. The connection between a valve seat and a valve body has a primary weld connection, and additionally, a pin is inserted through the valve seat into a recess in the valve body.

13 Claims, 5 Drawing Sheets

HIGH TEMPERATURE VALVE

BACKGROUND OF THE INVENTION

This invention relates to valves and the construction thereof.

Conventional gate valves, swing-check valves, and globe valves have been utilized in a myriad of applications. Problems have been encountered in certain operating conditions involving high pressure ranges, highly corrosive fluids, high temperature ranges, and a high number of cycles. In these extreme operating conditions, connections between internal valve parts fail, requiring repair or replacement of the valve. Generally, the valves tend to fail in areas subject to sliding contact. The failure of the connections is intensified by the required use of different materials. Specifically, the valve body which acts as a pressure vessel must be a strong, tough, and somewhat ductile material with a high modulus of elasticity while the guide channel, valve seats, and facing ring which serve as wearing surfaces must be of a harder less ductile material. These different materials typically have diverse thermal expansion coefficients resulting in diverse amounts and rates of expansion and contractions between the parts due to temperature changes. If the parts are restrained by welding, the welds will be subject to high thermal stresses, eventually resulting in weld failure.

It is well known that guide channels which guide a wedge in and out of closed position in a valve can be attached to allow for thermal expansion by forming an aperture with a counterbore in the guide channel, inserting a pin having a rim through the aperture, and welding the pin to the body of the valve. The rim is sized to fit into the counterbore, engage the guide channel, and hold the guide channel against the body. The guide channel is allowed to expand and contract with temperature because the pin and the rim are of such a size that there is a gap between the outer circumference of the pin and the rim and the inner circumference of the aperture and the counterbore. However, the weld is not immune from thermal stress, and the weld is further subject to attack in a highly corrosive and high cycle environment. If a weld fails, the guide channel can no longer serve its function of properly positioning the wedge in the closed position.

It is also conventional to weld a facing ring, which seals against the valve seat, to a wedge or disc, hereafter referred to as the stop, of a valve. Though the stop is not a pressure vessel, it must still retain pressure. Thus, the thermal expansion problem also exists between the stop and facing ring. Again, the weld is subject to thermal stresses from the differential thermal expansion of the stop and the facing rings and from weakening by corrosive fluids. A facing ring weld failure prevents the facing ring from sealing against the valve seat and, if the failure is extensive, can result in an inability to close the valve and damage to the internal valve parts.

A valve seat is typically attached to the valve body with a circumferential weld which is subject to the same thermal stresses and corrosion as the welds of the guide channels but without the benefit of the pin and aperture connection discussed above. Failure of the connection between the valve seat and the body results in an inability to close the valve and possible damage to the valve. The art has proposed a valve seat which is threaded into the valve body, but forming the threads in the valve seat and in the valve body greatly increases the cost of the valve.

These problems require routine maintenance to replace parts or even entire valves. Thus, reduction in the required maintenance and replacement of parts in gate, swing-check, and globe valves is desirable to reduce the maintenance cost and increase the useful life of the valves. Such an increase in the life of the valve translates directly into a reduction of cost.

BRIEF SUMMARY OF THE INVENTION

To address such problems, there is provided in the practice of this invention a secondary connection between a valve seat and a valve body in addition to the primary connection of a secondary connection comprising at least one pin inserted through the valve seat and into a recess in the body and a weld securing the pin in the valve seat.

Further, there is provided a secondary connection between a facing ring and a valve stop having at least one bolt inserted through the facing ring and holding the facing against the stop.

Still further provided is a secondary connection between a guide channel and a valve body. The valve body has a pair of opposing oppositely inclined surfaces formed therein which retain a pair of opposing oppositely inclined surfaces on the guide channel.

The invention is also directed to a valve including a body with a passage therethrough, a valve seat connected to the body, a stop having open and closed positions, a guide channel connected to the body in which the stop slides, and primary and secondary means for connecting the guide channel to the body.

The invention is further directed to a valve having a body with a passage therethrough, a valve seat connected to the body, a stop having open and closed positions in the passage, a facing ring connected to the stop for sealably engaging the valve seat when the stop is in the closed position, and primary and secondary means for connecting the facing ring to the stop.

The invention is still further directed to a valve having a body with a passage therethrough, a valve seat connected to the body, a stop having open and closed positions, and primary and secondary means for connecting the valve seat to the body.

These and other features and advantages of this invention will appear from the following description of the preferred embodiments and the accompanying drawings in which similar reference characters denote similar elements throughout the several views.

DETAILED DESCRIPTION

Figure 1:
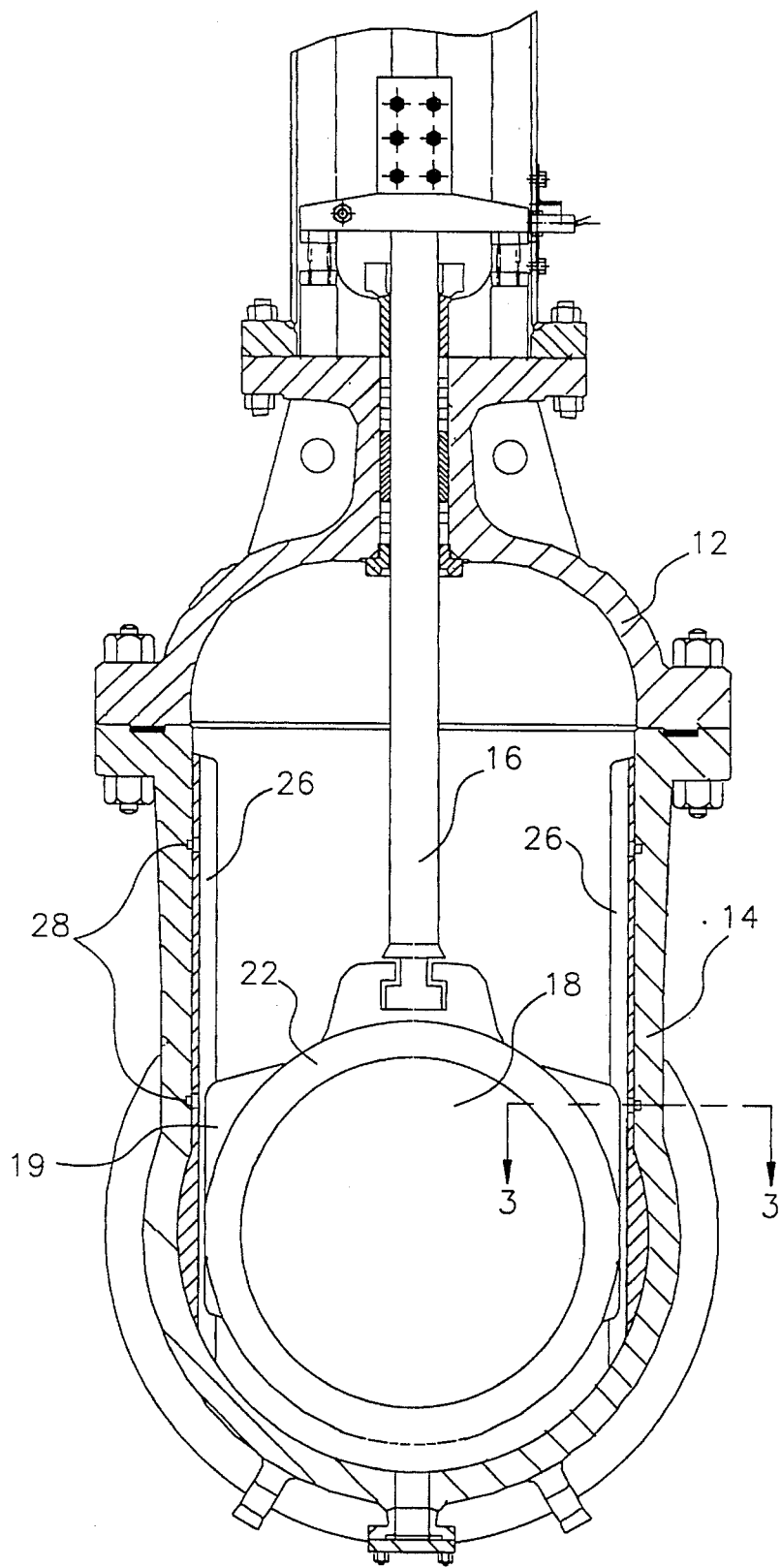
FIG. 1 is a transverse cross-sectional view of a gate valve illustrating the stop in a closed position in the passage of the valve.
Figure 2:
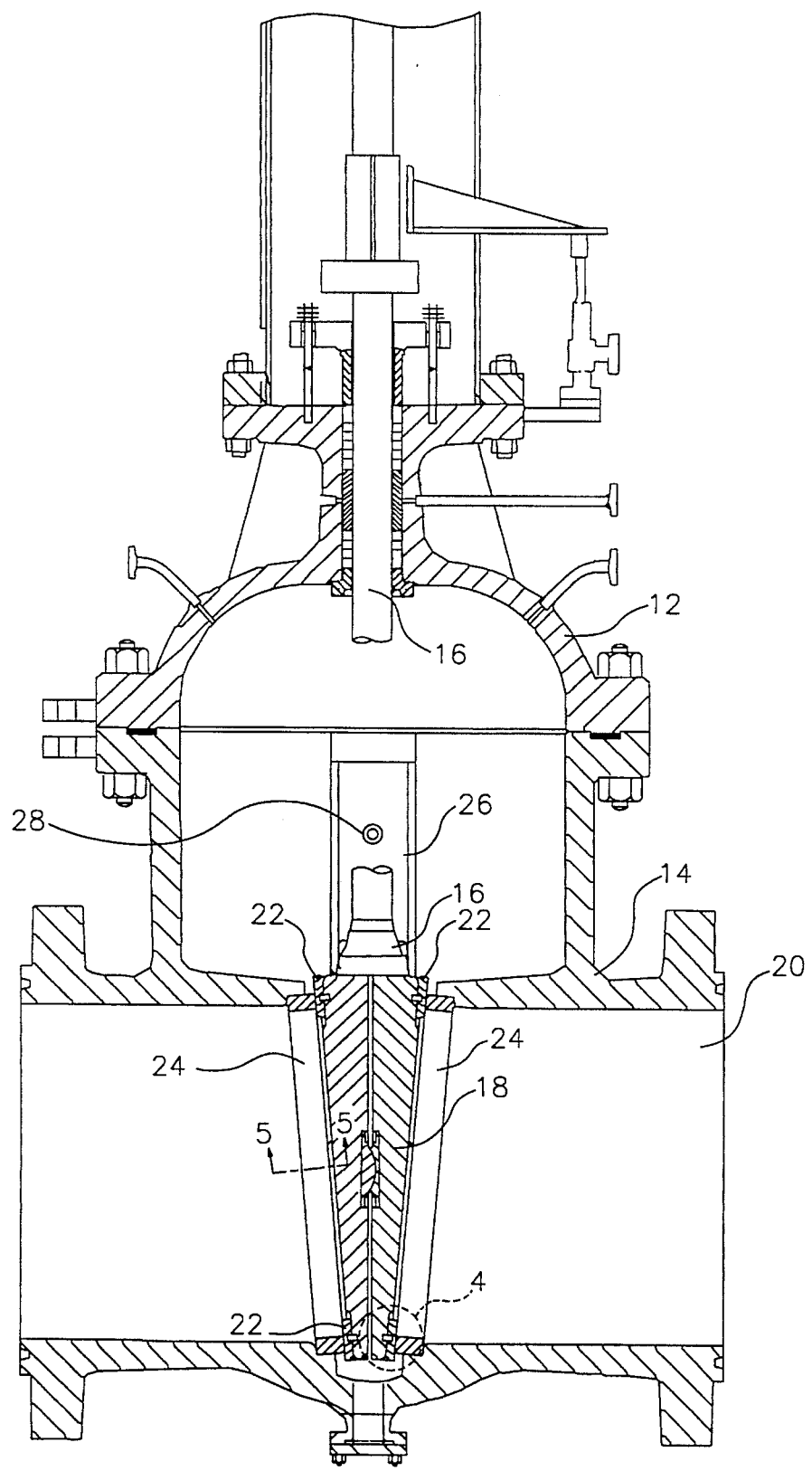
FIG. 2 is a longitudinal cross-sectional view of a gate valve illustrating the stop in a closed position in the passage of the valve.

FIGS. 1 and 2, show a gate valve having a conventional bonnet 12 fastened to a body 14. The exemplary gate valve utilizes a conventional T-head stem 16 with a conventional split stop 18 connected thereto which has two functioning positions. The stop is shown in the closed position thereby preventing flow through the passage 20. The stop may be moved to an open position out of the passage by turning the handwheel (not shown). When the stop is in the closed position shown, a facing ring 22 seals against a valve seat 24 thereby preventing any flow through the passage. The stop is guided in and out of the closed position by a flange 19 which slides in a guide channel 26 secured to the valve body. The exemplary gate valve includes a variety of other conventional features which need not be further described for an understanding of the invention.

Figure 3:
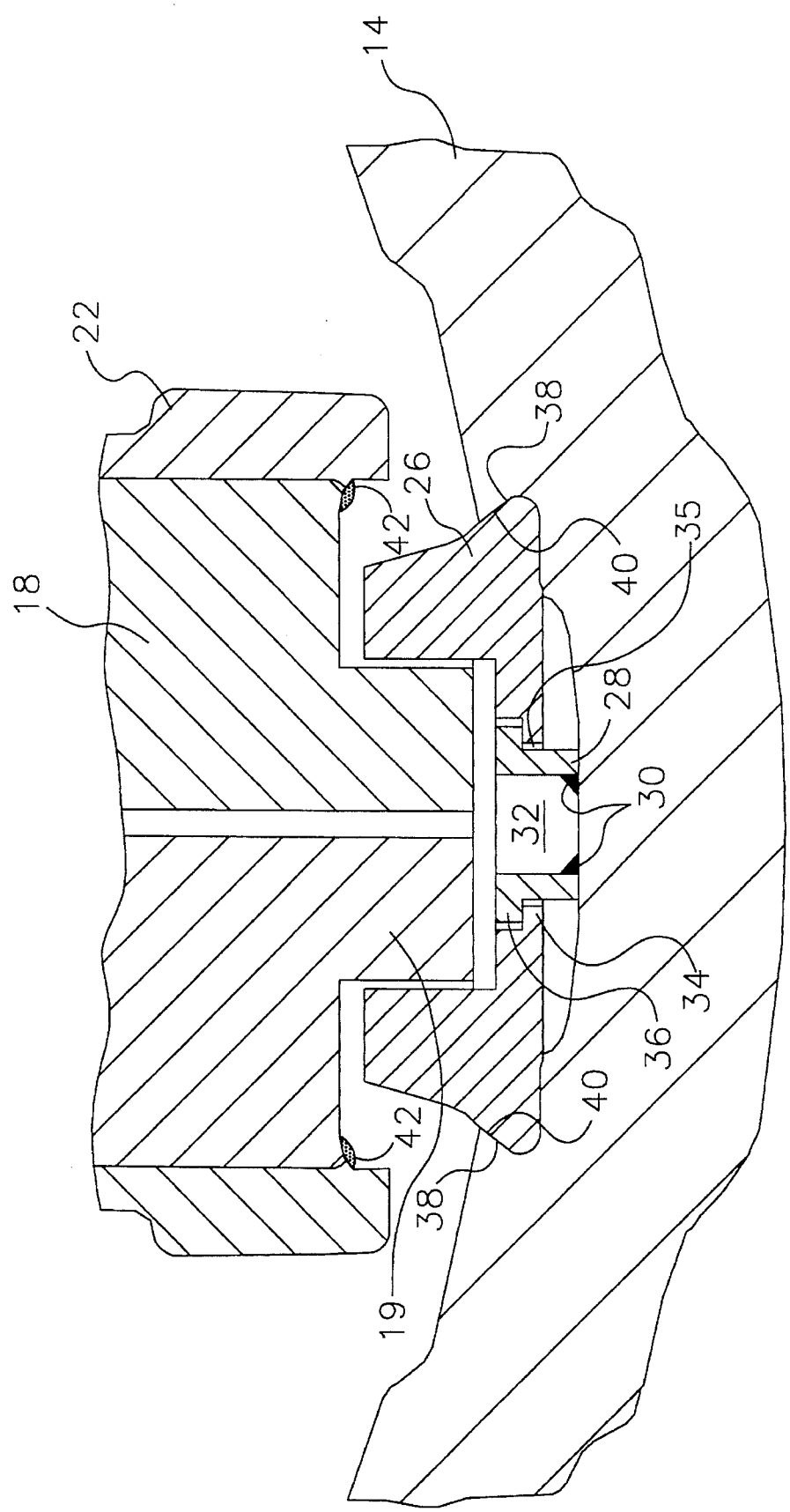
FIG. 3 is a fragmentary cross-sectional view taken along line 3—3 of FIG. 1, illustrating the attachment of the guide channel to the body.

The guide channel 26 is secured to the body 14 with a pin 28 which is welded to the body at 30 as shown in FIG. 3. The pin is a hollow cylinder with a circumferential rim 36 on one end, and the guide channel has an aperture 32 with a counterbore 34. When the pin is inserted through the aperture, the rim of the pin fits into the counterbore and secures the guide channel because the diameter of the rim is larger than the diameter of the aperture. Although the diameters of the rim and aperture are chosen so that the pin can hold the guide channel to the body, the diameter of the counterbore is larger than the diameter of the rim and the diameter of the aperture is larger than the smallest diameter of the pin. Arranging the relative dimensions of the diameters in this manner allows the guide channel to expand and contract within the gap 35 between the pin and guide at a different rate and amount than the body. The aperture 32, counterbore 34, and pin 28 can have a circular or a slotted shape. If a slotted shape is used, the respective size of the slots are varied in the same manner as the diameters. This arrangement is desirable because of the different material properties required for the body and the guide channel. The body is a pressure vessel which must be of a strong, tough, and somewhat ductile material, while the guide channel serves as a wearing surface to allow the flange 19 of the stop to repeatedly slide in the channel, so that the stop can be cycled in and out of the closed position. Thus, the guide channel is of a harder and less ductile material than the body. Materials having different hardnesses and ductile properties frequently have considerable differences in the thermal expansion coefficients.

The above described pin and weld primary attachment allows for differential thermal expansion between the body and the guide channel. However, to ensure that the guide channel does not detach from the body in the event that the primary attachment fails, a secondary mechanical attachment is used to attach the guide channel to the body. The preferred embodiment shown in FIG. 3, has the body fabricated with a pair of opposing oppositely inclined surfaces 38. The guide channel also has a pair of opposing oppositely inclined surfaces 40. The two pairs of surfaces are built so that the guide channel may be pushed into the body 14 before the bonnet is attached to the body. After the bonnet is attached, the guide channel is prevented from longitudinal displacement in the valve by the bottom of the body and the bonnet. This method of attachment, commonly known as a dovetail or keyed slot, allows the guide channel to expand more or less than the body and at a different rate than the body, and even if the weld 30 on the pin fails, the guide channel is mated into the body which prevents the displacement of the guide channel even in highly corrosive, high pressure, and high cycle operating conditions.

With this design, high temperature ranges are compensated for by the relative size of the guide channel, male portion of the dovetail, and the opening between the inclined surfaces in the body which is the female portion of the dovetail. For example, a valve for a high temperature operating condition may have, depending on the choice of materials, a male dovetail portion smaller than the female dovetail portion at room temperature but which fit tightly together at operating temperature. Therefore, the stop 18 can repeatedly slide in the guide channel without dislodging the guide channel.

Figure 4:
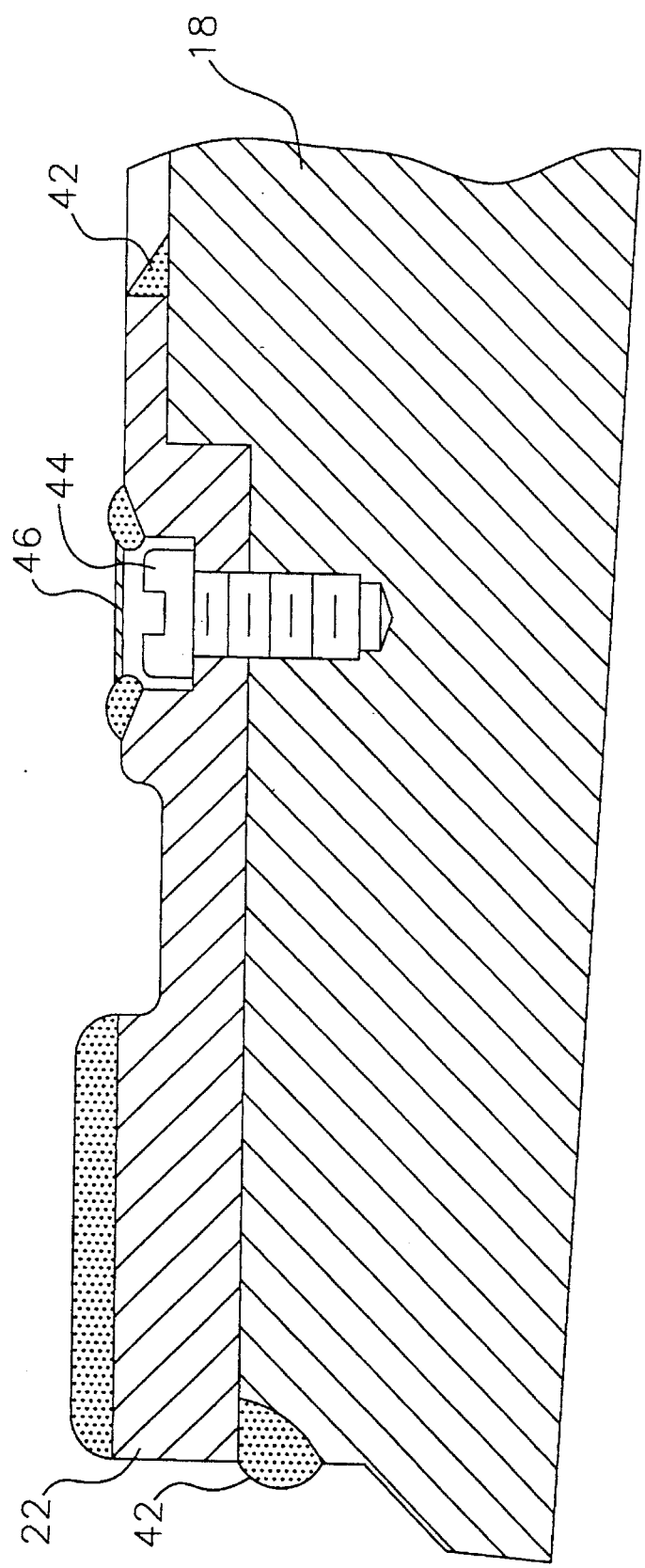
FIG. 4 is a fragmentary cross-sectional view of the stop of FIG. 1 with a facing ring illustrating the connection between the stop and the facing ring.

As discussed so far, the facing ring 22 is attached to what is commonly called the wedge 18 in a gate valve. However, other types of valves utilize a facing ring attached to a wedge, disc, or other type of stop. Therefore, the wedge or disc has been more generally referred to as the stop. The facing ring, which is shown in more detail in fragmentary cross section in FIG. 4, is attached to the stop with circumferential welds 42. The facing ring 22, which can be any shape depending on the valve, is subject to repeated contact with the valve seat, thereby stressing the welds, and the welds are subject to greater attack in corrosive environments. Therefore, a secondary attachment is provided in the event the primary attachment fails. In the preferred embodiment shown, a bolt 44 is inserted through the facing ring and threaded into the stop. Eight bolts spaced evenly around the facing are preferred, but more or fewer bolts at any spacing can be used. This secondary mechanical attachment insures that the facing ring will not break loose from the stop. If the welds 42 fail, the bolts will hold the facing ring in place. To prevent corrosion and loosening of the bolts, caps 46 are sealably welded over the bolts.

Figure 5:
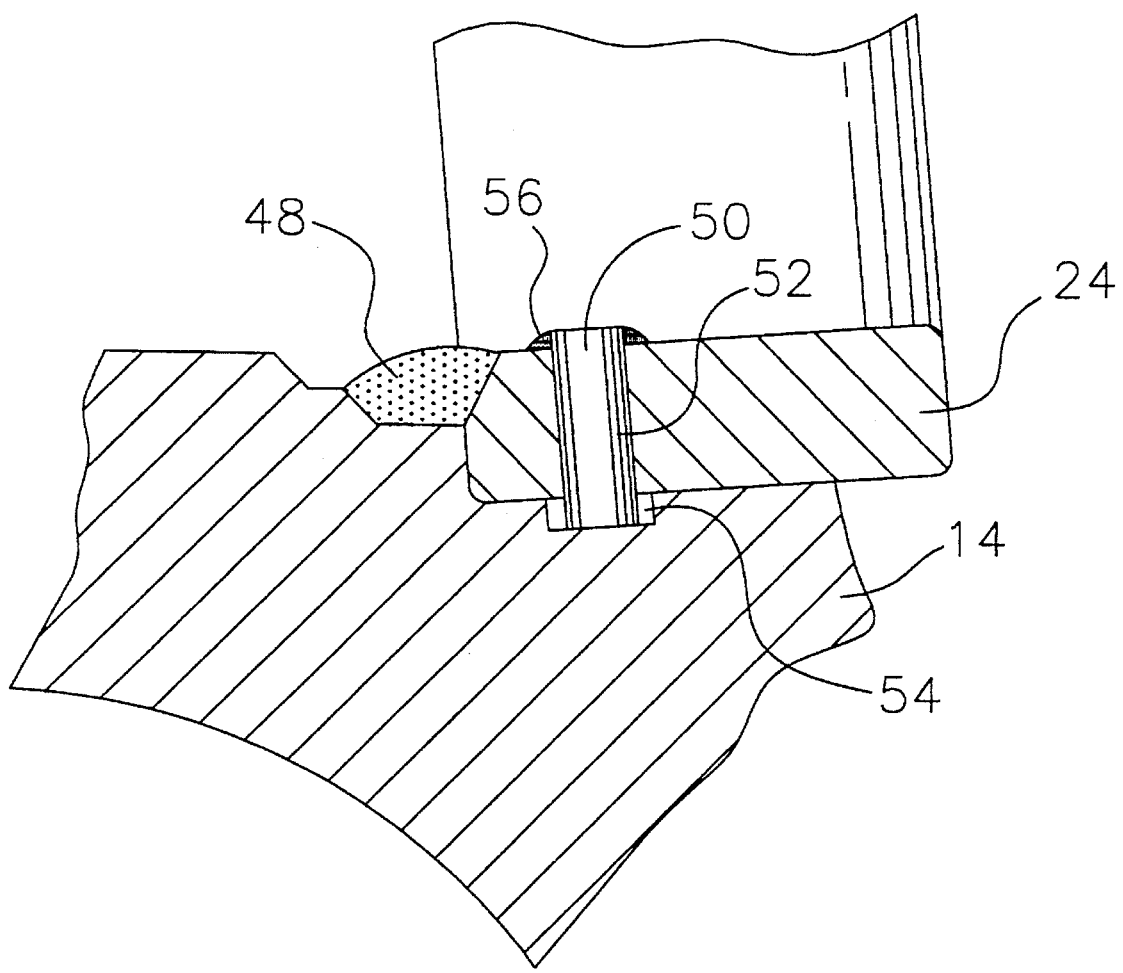
FIG. 5 is a fragmentary cross-sectional view taken along line 5—5 of FIG. 2 illustrating the attachment of the valve seat to the body.

Referring back to FIG. 2, the facing ring 22 just discussed seals against the valve seat 24 when the stop is moved into the closed position in the passage. The repeated engagement of the facing ring against the valve seat can also cause the failure of the circumferential weld 48, shown in FIG. 5, which attaches the valve seat to the body. The possibility of weld failure is increased in a corrosive environment and in operating conditions requiring a high number of cycles. Therefore, a secondary attachment is provided which utilizes a straight pin 50 inserted through an aperture 52 in the valve seat and into a shallow recess 54 in the body 14. The pin is then sealably welded in position with a weld 56 connecting the pin to the valve seat. In a typical valve, four pins evenly spaced around the valve seat are preferred, but more or fewer at any spacing can be used. The recess is the shape of a cylinder or channel, or the recess is circumferential. The circumferential recess and the channel shaped recess allow for more variance in the spacing of the pins. The valve seat and facing ring are utilized in many types of valves and can be more generally referred to as sealing rings.

This secondary mechanical method of attachment, again, insures that the valve seat will maintain its position within the valve, allowing the valve to continually seal and prevent damage to the valve from a dislodged valve seat. If the weld 48 fails, the pins will contact the wall of the recess and the valve seat will not dislodge.

Thus, improved connections and valves incorporating those connections are disclosed which utilize two types of attachment to obtain a valve with a longer functioning life. While embodiments and applications of this invention have been shown and described, it would be apparent to those skilled in the art that many more modifications are possible without departing from the inventive concepts herein. For example, the pin attachments of FIGS. 3 and 5 and the bolt attachment of FIG. 4 are interchangeable. Each type of attachment can be used to connect the guide channel to the body, the valve seat to the body, and the facing ring to the stop.

Further, these connections can be utilized in valve types other than those specifically discussed. It is, therefore, to be understood that within the scope of the appended claims, this invention may be practiced otherwise than as specifically described.

What is claimed is:

1. A valve comprising:

a body having a passage therethrough;

a valve seat connected to the body;

a stop movable with respect to the body and having an open position and a closed position, the stop sealably engaging the valve seat in the closed position;

a guide channel connected to said body and slidably engaging the stop;

a primary means for connecting the guide channel to the body; and a secondary means for connecting the guide channel to the body.

2. The valve according to claim 1, wherein the primary means of connecting the guide channel to the body comprises an aperture in the guide channel, the aperture has an aperture diameter and a counterbore diameter, a pin having a rim with rim diameter larger than the aperture diameter and smaller than the counterbore diameter, the pin is inserted through the aperture, the rim fits into the counterbore and engages the guide channel, and the pin is welded to the body, and the secondary means for connecting the guide channel to the body comprises a dovetail assembly.

3. A valve having a connection between a guide channel and a valve body comprising a primary means for connection between the guide channel and the valve body and a secondary means for connection between the guide channel and the valve body comprising two opposing oppositely inclined surfaces on the guide channel held by a second set of two opposing oppositely inclined surfaces in the body.

4. The connection according to claim 3, wherein the primary means for connection further comprises an aperture in the guide channel, the aperture has an aperture size and a counterbore size, a pin having a rim with a rim size larger than the aperture size and smaller than the counterbore size, the pin is inserted through the aperture, the rim engages the guide channel, and the pin is welded to the body.

5. A high temperature valve comprising:

a valve body made of a first material;

a stop mounted in the valve body for opening or closing the valve;

at least one guide channel for the stop secured to the valve body and made from a second material different from the first material;

primary means for securing the guide channel to the valve body; and secondary means for retaining the guide channel secured to the valve body in the event of failure of the primary means, the secondary means being different from the primary means.

6. A valve as recited in claim 5 wherein the secondary means for retaining comprise means for loosely securing the guide channel to the valve body.

7. A valve as recited in claim 5 wherein the secondary means for retaining comprise a dove tail assembly.

8. A valve comprising:

a body having a passage therethrough;

a valve seat connected to the body;

a primary means for connecting the valve seat to the body;

a secondary means for connecting the valve seat to the body;

a stop movable with respect to the body and having a closed position in the passage and an open position next to the passage;

a facing ring connected to the stop and sealably engaging the valve seat when the stop is in the closed position;

a primary means for connecting the facing ring to the stop;

a secondary means for connecting the facing ring to the stop;

a guide channel connected to said body and slidably engaging the stop for guiding the stop between open and closed positions;

a first means for connecting the guide channel to the body; and a secondary means for connecting the guide channel to the body.

9. The valve according to claim 8, wherein the body has a recess, the first means for connecting the valve seat to the body comprises a weld, and the second means for connecting the valve seat to the body comprises at least one pin inserted through the valve seat and into the recess.

10. The valve according to claim 9, wherein the pin is sealably welded to the valve seat.

11. The valve according to claim 8, wherein the first means for connecting the facing ring to the stop comprises a circumferential weld and the second means for connecting the facing ring to the stop comprises at least one bolt inserted through the facing ring and holding the section face to the stop.

12. The valve according to claim 11, further comprising at least one cover plate sealably welded to the facing ring over at least one bolt.

13. The valve according to claim 8, wherein the first means for connecting the guide channel to the body comprises an aperture in the guide channel, the aperture has an aperture size, a counterbore size, a pin having a lip, having a rim size larger than the aperture size and smaller than the counterbore size, the pin is inserted through the aperture, the rim engages the guide channel, and the pin is welded to the body; and the second means for connecting the guide channel to the body comprises the channel having a first set of two opposing oppositely inclined surfaces held by a second set of two opposing oppositely inclined surfaces in the body.

* * * * *